US010877868B2

United States Patent
Diaconu et al.

(10) Patent No.: US 10,877,868 B2
(45) Date of Patent: Dec. 29, 2020

(54) APPLYING A LOG TO STORAGE SEGMENTS

(71) Applicant: Microsoft Technology Licensing, LLC, Redmond, WA (US)

(72) Inventors: Cristian Diaconu, Kirkland, WA (US); Alexander Budovski, Snohomish, WA (US); Alejandro Hernandez Saenz, Kirkland, WA (US); Naveen Prakash, Sammamish, WA (US); Krystyna Reisteter, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 120 days.

(21) Appl. No.: 16/138,083

(22) Filed: Sep. 21, 2018

(65) Prior Publication Data
US 2020/0097384 A1    Mar. 26, 2020

(51) Int. Cl.
G06F 11/34    (2006.01)
G06F 16/27    (2019.01)
G06F 11/14    (2006.01)
H04L 29/08    (2006.01)

(52) U.S. Cl.
CPC ...... *G06F 11/3476* (2013.01); *G06F 11/1471* (2013.01); *G06F 16/27* (2019.01); *H04L 67/1097* (2013.01); *G06F 2201/82* (2013.01)

(58) Field of Classification Search
CPC .. G06F 11/3476; G06F 16/27; G06F 11/1471; G06F 2201/82; G06F 11/1451; H04L 67/1097; H04L 67/1095; H04L 67/1076
See application file for complete search history.

(56) References Cited

U.S. PATENT DOCUMENTS

| | | | |
|---|---|---|---|
| 6,466,970 B1 | 10/2002 | Lee et al. | |
| 6,879,995 B1 | 4/2005 | Chinta et al. | |
| 8,365,188 B2 | 1/2013 | Goldspink et al. | |
| 8,365,196 B2 | 1/2013 | Zhang et al. | |
| 9,208,032 B1 * | 12/2015 | McAlister | G06F 11/1471 |
| 9,514,007 B2 | 12/2016 | Gupta et al. | |
| 10,567,500 B1 * | 2/2020 | Leshinsky | H04L 67/1097 |
| 2003/0237022 A1 | 12/2003 | Thayer | |
| 2015/0261674 A1 | 9/2015 | Wei et al. | |
| 2016/0092914 A1 | 3/2016 | Wiener et al. | |

(Continued)

OTHER PUBLICATIONS

"International Search Report and Written Opinion Issued in PCT Application No. PCT/US19/039099", dated Oct. 18, 2019, 11 Pages.

(Continued)

*Primary Examiner* — Matthew M Kim
*Assistant Examiner* — Kurosu Risa Altaf
(74) *Attorney, Agent, or Firm* — Workman Nydegger

(57) ABSTRACT

Use of a log service computing system to apply a log to storage segments in the context of there being a primary compute system that operates upon data, and secondary compute system(s) that are at the ready to be promoted to the new primary compute system should the old primary compute system fail. Rather than have each of the primary and secondary compute systems maintain their own replicated of the entire data locally, the data is separated in storage segments that are collectively distributed amongst multiple storage segment servers.

19 Claims, 10 Drawing Sheets

(56) References Cited

U.S. PATENT DOCUMENTS

2016/0246867 A1* 8/2016 Bourbonnais ....... G06F 11/2035
2018/0046552 A1* 2/2018 Madhavarapu ..... G06F 11/1446

OTHER PUBLICATIONS

"BMC Remedy Mid Tier logging", Retrieved from https://web.archive.org/web/20151025073704/https:/docs.bmc.com/docs/display/public/ars81/BMC+Remedy+Mid+Tier+logging, Oct. 25, 2015, 2 Pages.

"Virtual Hosts", Retrieved from https://web.archive.org/web/20050724232127/https:/httpd.apache.org/docs/1.3/logs.html, Jul. 24, 2005, 6 Pages.

"Work with Log Files", Retrieved from https://onlinehelp.tableau.com/current/server/en-us/logs_working_with.htm, Jun. 28, 2018, 2 Pages.

* cited by examiner

APPLYING A LOG TO STORAGE SEGMENTS

BACKGROUND

A variety of services are now offered in a cloud computing environment. "Cloud computing" is a model for enabling ubiquitous, on-demand network access to a shared pool of configurable computing resources (e.g., networks, servers, storage, applications, and services). A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. One type of software as a service ("SaaS") is known as database as a service (DBaaS).

Conventional DBaaS is typically implemented within an architecture that includes one primary compute node and one or more secondary compute nodes (each node often provided as a virtual machine). The primary compute node operates a database server and has a directly attached solid state drive that the primary database server may read from and write to. Secondary compute nodes also operate the database server and also have a solid-state drive that the respective secondary database server may read from and write to. The data on the primary compute node is synchronized with the secondary compute nodes.

The secondary compute nodes provide redundancy with the aim of meeting service availability objectives. If the primary compute node was to fail, failover of the database may occur by promoting one of the secondary compute nodes to the primary compute node, and instantiating an additional secondary compute node to maintain the desired level of redundancy.

In order to synchronize the data at the primary compute node with the data at the secondary compute nodes, communication is required from the primary compute node to the secondary compute nodes. The primary compute node keeps a log of operations that occur at the primary compute node. The primary compute node may send the log records (either individually or as a block) to the secondary computing nodes. The secondary compute nodes each apply the operations specified by the primary compute node, and acknowledges such back to the primary compute node. Once the primary compute node receives such an acknowledgement back from a quorum (say two out of three secondary compute nodes), the primary compute node has synchronized its data with the secondary compute nodes to a degree that if the primary compute node goes down, there is a guaranty that a majority of the secondary compute systems will have the log record applied. Thus, in case of recovery, even if the newly elevated primary compute node had not yet applied the log record, that newly elevated primary compute node may still update itself with the current data by consulting with the other secondary compute nodes.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to applying a log to storage segments in the context of there being a primary compute system that operates upon data, and secondary compute system(s) that are at the ready to be promoted to the new primary compute system should the old primary compute system fail. However, rather than have each of the primary and secondary compute systems maintain their own replicated copy of the entire data locally, the data is separated in storage segments that are collectively distributed amongst multiple storage segment servers. The storage segment servers collectively act as a centralized store of the data. A log service computing system facilitates this in accordance with the principles described herein.

For instance, as the primary compute system operates upon the data, the various write operations are logged in various log records. As an example, in order to perform a write operation to a storage segment, the primary compute system may read the storage segment from the appropriate storage segment server (or from its own cache if the storage segment is cached), and may perform the write operation to that copy of the storage segment. Furthermore, to log this write operation, the primary compute system identifies how the content of the storage segment changed, records the incremental change and the identifier of the storage segment within a log record, and writes that log record into a persisted log (perhaps with other log records in a block). The log service computing system may note the presence of the log record either by reading the log record from the persisted log, or by receiving a communication from the primary compute system.

The log service computing system facilitates application of the log record by identifying a particular storage segment server that is assigned to store a particular set of storage segments that includes the storage segment that is to be written to. The log service computing system then causes the particular storage segment server to perform the particular write operation designated in that log record. The log service computing system may also cause one or more secondary compute systems to perform the particular write operation to a copy of the storage segment that is present on the secondary compute system(s). As an example, the log service computing system may receive requests from the storage segment server(s) and the secondary compute system(s) for log records. The log service computing system may then provide the log records that it is aware of to the entities that request it. In one embodiment, to avoid inconsistent recovery, the log service computing system does not provide log records that it has not yet confirmed have been persisted in the persistent log.

Handling log records in this way has a number of technical advantages. First, the data (e.g., the database and the log records logging operations on that user data) is no longer confined to the primary or secondary compute systems themselves, which can have a relatively limited storage capacity. For instance, if the compute system is executed within a virtual machine, the size of the data is conventionally limited to the size that the largest virtual machine storage size. Instead, log records are persisted in a centralized persisted log. The user data (e.g., a database) is stored amongst storage segment servers. The larger the user data, the more storage segments servers there may be. Thus, the size of the data may be potentially unbounded.

Furthermore, when the storage segment servers store their respective data using a storage service offered by a cloud computing environment, there is no need to perform size of data operations. For instance, such size of data operations may be the performance of a full backup (or a snapshot) of the entirety of the data. Conventionally, the primary compute system and each of the secondary compute systems would have to perform a full backup separately, by transferring data over a network. Thus, the principles described herein avoid size of data operations, and thus scales better for larger sizes of data.

Additionally, the time taken to build a new secondary compute system is reduced significantly since a new secondary compute system no longer needs to have a directly attached volume with an entire replica of the data. Instead, the secondary compute system only may need the operating application (e.g., the database server), and a relatively small cache. Furthermore, the establishment of a quorum for purposes of determining whether a log record has been properly entered into the log may now be handled by a storage service, in cases in which the primary compute system writes to a volume attached into that storage service. In such cases, the write to the persisted log only completes once the storage service has established that the log record has been durably written to an appropriate number of locations.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Therefore, these drawings depict only example embodiments of the invention and are not therefore to be considered to be limiting of the scope of the invention. With this in mind, example embodiments of the invention will be described and explained with reference to the accompanying drawings in which.

DETAILED DESCRIPTION

Figure 1:
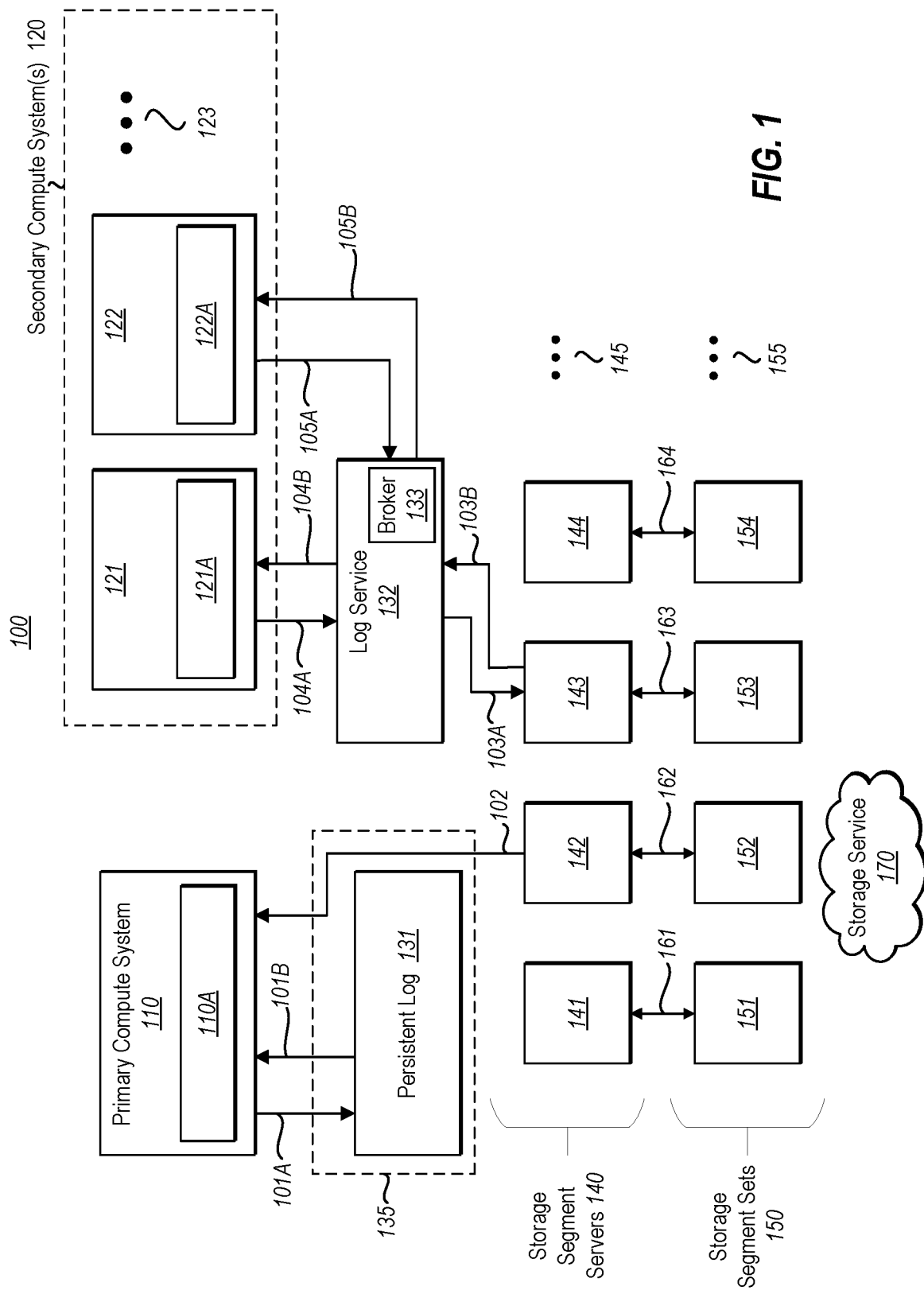
FIG. 1 illustrates an environment in which the principles described herein may be employed, which includes a primary compute system, one or more secondary compute systems, storage segment servers across which data is stored, a persistent log, and a log service for applying log records generated by the primary compute system.

At least some embodiments described herein relate to applying a log to storage segments in the context of there being a primary compute system that operates upon data, and secondary compute system(s) that are at the ready to be promoted to the new primary compute system should the old primary compute system fail. However, rather than have each of the primary and secondary compute systems maintain their own replicated copy of the entire data locally, the data is separated in storage segments that are collectively distributed amongst multiple storage segment servers. The storage segment servers collectively act as a centralized store of the data. A log service computing system facilitates this in accordance with the principles described herein.

For instance, as the primary compute system operates upon the data, the various write operations are logged in various log records. As an example, in order to perform a write operation to a storage segment, the primary compute system may read the storage segment from the appropriate storage segment server (or from its own cache if the storage segment is cached), and may perform the write operation to that copy of the storage segment. Furthermore, to log this write operation, the primary compute system identifies how the content of the storage segment changed, records the incremental change and the identifier of the storage segment within a log record, write that log record into a persisted log (perhaps with other log records in a block). The log service computing system may note the presence of the log record either by reading the log record from the persisted log, or by receiving a communication from the primary compute system.

The log service computing system facilitates application of the log record by identifying a particular storage segment server that is assigned to store a particular set of storage segments that includes the storage segment that is to be written to. The log service computing system then causes the particular storage segment server to perform the particular write operation designated in that log record. The log service computing system may also cause one or more secondary compute systems to perform the particular write operation to a copy of the storage segment that is present on the secondary compute system(s). As an example, the log service computing system may receive requests from the storage segment server(s) and the secondary compute system(s) for log records. The log service computing system may then provide the log records that it is aware of to the entities that request the log record. In one embodiment, to avoid inconsistent recovery, the log service computing system does not provide log records that it has not yet confirmed have been persisted in the persistent log.

Handling log records in this way has a number of technical advantages. First, the data (e.g., the database and the log records logging operations on that user data) is no longer confined to the primary or secondary compute systems themselves, which can have a relatively limited storage capacity. For instance, if the compute system is executed within a virtual machine, the size of the data is conventionally limited to the size that the largest virtual machine storage size. Instead, log records are persisted in a centralized persisted log. The user data (e.g., a database) is stored amongst storage segment servers. The larger the user data, the more storage segments servers there may be. Thus, the size of the data may be potentially unbounded.

Furthermore, when the storage segment servers store their respective data using a storage service offered by a cloud computing environment, there is no need to perform size of data operations. For instance, such size of data operations may be the performance of a full backup (or a snapshot) of the entirety of the data. Conventionally, the primary compute system and each of the secondary compute systems would have to perform a full backup separately, by transferring data over a network. Thus, the principles described herein avoid size of data operations, and thus scales better for larger sizes of data.

Additionally, the time taken to build a new secondary compute system is reduced significantly since a new secondary compute system no longer needs to have a directly attached volume with an entire replica of the data. Instead, the secondary compute system only may need the operating application (e.g., the database server), and a relatively small cache. Furthermore, the establishment of a quorum for purposes of determining whether a log record has been properly entered into the log may now be handled by a storage service, in cases in which the primary compute system writes to a volume attached into that storage service. In such cases, the write to the persisted log only completes once the storage service has established that the log record has been durably written to an appropriate number of locations.

FIG. 1 illustrates an environment 100 in which the principles described herein may be employed. As an example only, the environment 100 may be a network, such as perhaps a cloud computing environment. The environment 100 includes a primary compute system 110 that operates thereon an application 110A. As an example, the application 110A may be a database server application. The primary compute system 110 may be a physical computing system (such as a compute node in a cloud computing environment), in which case the primary compute system 110 may be structured as described below with respect to the computing system 800 of FIG. 8 below. Alternatively or in addition, the primary compute system 110 may be a virtual machine that emulates a computing system. The application 110A running on the primary compute system 110 performs write operations against user data. For instance, if the application 110A is a database server, the user data would be the database.

The environment 100 also includes secondary compute systems(s) 120. Each of the secondary compute system(s) 120 operates a corresponding application, which may be an instance of the very same application that is being run on the primary compute system 110. For instance, if the application 110A on the primary compute system 110 was a database server application, an instance of the database server application may be run on each of the secondary compute system(s) 120. The secondary compute system(s) 120 may each be a physical computing system (such as a compute node in a cloud computing environment), in which case the secondary compute system may be structured as described below with respect to the computing system 800 of FIG. 8. Alternatively or in addition, each secondary compute system(s) 120 may be a virtual machine that emulates a computing system.

The secondary compute system(s) 120 may include any number of secondary compute systems. In the illustrated embodiment, there are two secondary compute systems 121 and 122 illustrated, each operating a respective application 121A and 122A. The ellipsis 123 represents that the principles described herein are not limited to the number of secondary compute system(s) 120. Should the primary compute system 110 fail such that recovery is not efficiently possible, one of the secondary compute system(s) 120 would be promoted to be the new primary compute system, thus allowing that promoted compute system to perform write operations. Thus, the secondary compute system(s) 120 allows for there to be built-in redundancy within the environment 100. If a secondary compute system is promoted to be the primary compute system, a new secondary compute system may be started in order to replace the promoted compute system and thereby retain a desired number of secondary compute system(s) 120. On the other hand, secondary compute systems may be added or removed from the set of secondary compute system(s) at will independent of whether the primary compute system 110 has failed.

When the primary compute system 110 performs write operations to user data (e.g., a database), the primary compute system 110 logs (as represented by arrow 101A) those data operations into a persistent log 131. The persistent log 131 is kept so that the environment 100 may recover in case of a failure. The process of the primary compute system 110 writing to a storage segment (e.g., a page of user data), while persistently logging that write operation, will now be described.

Figure 2:
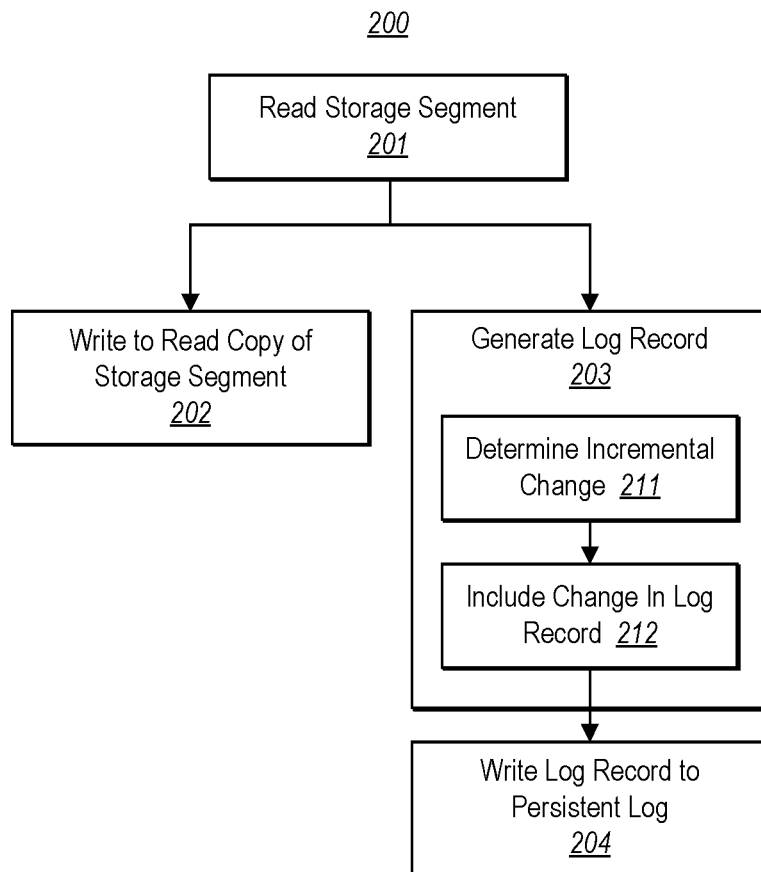
FIG. 2 illustrates a flowchart of a method for generating a log record and performing a write operation.

In particular, FIG. 2 illustrates a flowchart of a method 200 for generating a log record and performing a write operation. As an example, the method 200 may be performed by the primary compute system 110 of FIG. 1. The primary compute system first reads a particular storage segment (act 201). This ensures that a copy of the storage segment is brought into the cache of the primary compute system. The storage segment may have been previously read by the primary compute system, in which case that storage segment will already be within the cache of the primary compute system. Otherwise, the primary compute system performs a read operation from the respective storage segment server that contains the storage segment that is to be written to. In FIG. 1, for instance, the primary compute system 110 reads (as represented by arrow 102) a storage segment (e.g., a page) from the storage segment server 142).

Figure 3:
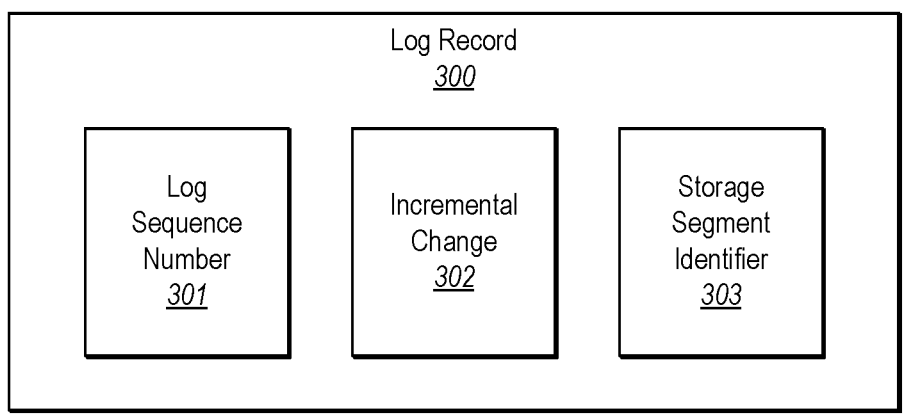
FIG. 3 illustrates a log record that includes a log sequence number, a description of the incremental change to a storage segment, as well as the storage segment identifier to which that change was applied.

The primary compute system then writes to the read (e.g., cached) copy of that storage segment (act 202). Also, to create a log record of that write operation (act 203), the incremental change made or to be made as part of that write operation is determined (act 211). The primary compute system then creates a log record that includes the incremental change (act 212). For instance, FIG. 3 illustrates a log record 300 that includes a log sequence number 301, description of the incremental change 302, as well as the storage segment identifier 303 to which that change was applied. A log sequence number is a number that uniquely identifies a log record, and that represents a position of the log record within the log. The log sequence number is typically a monotonically increasing number such that the higher the log sequence number, the more recent the log record was placed within the log. The log record is written in a persistent log (act 204). For instance, in FIG. 1, as represented by arrow 101A, the primary compute system 110 writes the log record (e.g., log record 300) into the persistent log 131.

Figure 4:
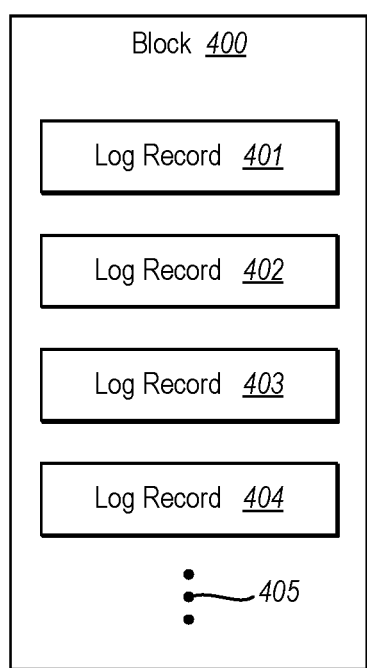
FIG. 4 illustrates a block populated with multiple log records.

In one embodiment, the log records are organized into blocks. A block is a unit of storage that may be written to and read from atomically (i.e., at one time—such that the write or read is either completed for the entire block, or abandoned with no write being performed at all). A typical block size will be constant in a computing system, but example block sizes include 512 and 4096 bytes. Because a log record may be much smaller than a block, a block may include multiple log records. FIG. 4 illustrates a block 400 populated with multiple log records 401, 402, 403 and 404. As an example, the log record 300 of FIG. 3 might be the log record 402 of FIG. 4. The ellipsis 405 represents that the block 400 may include any number of blocks that are suitable given the size of a log record, and the size of the block. Each log record may be said to occupy a "slot" within the block. When writing the log record to the persistent log (as represented by arrow 101A of FIG. 1 and act 204 of FIG. 2), it may be a block of log records (such as block 400) that is written to the persistent log. Thus, the primary compute system 110 may wait for some number of log records to be generated before writing the log records as a block to the persistent log 131.

Returning to FIG. 1, the environment 100 also include a log service computing system 132. The log service computing system 132 may be a physical computing system, such as the computing system 800 described below with respect to FIG. 8. Alternatively or in addition, the log service computing system 132 may be a virtual machine, or perhaps may be an executable component, such as the executable component 806 described below with respect to FIG. 8. The log service computing system 132 helps write operations that are performed and logged by the primary computing system 110 to be propagated to the appropriate storage segment server 140, and to the secondary compute system(s) 120.

The environment 100 also includes multiple storage segment servers 140. The data operated upon by the application 110A on the primary compute system 110 is spread across the storage segment servers 140. Each storage segment server is thus for servicing storage segments corresponding to only a portion of the user data. Storage segments may, for instance, be pages of data. Each page of data may include multiple blocks.

For instance, as represented by arrow 161 in FIG. 1, storage segment server 141 performs data operations for only the assigned storage segment set 151. Furthermore, arrow 162 represents that storage segment server 142 performs data operations only for its assigned storage segment set 152, arrow 163 represents that storage segment server 143 performs data operations for only its assigned storage segment set 153, and arrow 164 represents that storage segment server 144 performs data operations for only its assigned the storage segment set 154. The ellipses 145 and 155 represent that the principles described herein are not limited to the number of storage segment servers. Furthermore, the storage segment set assigned to any given storage segment server need not be contiguous storage segments within an address space.

However, identifying which storage segment server is assigned to perform data operations for a given storage segment is simpler if the storage segments (e.g., pages) assigned to any given storage segment are contiguous within the address space of the user data. Furthermore, read operations on continuous storage segments may be more efficiently performed on contiguous storage segments since a single read operation may be issued to return potentially many contiguous storage segments that are contiguous in the address space of the user data. In one embodiment, the user data is represented within a storage service 170 that underlies the storage segment servers 140. The user data distributed across the storage segment servers 140 may maintain the same layout and structure as the user data on the storage service 170.

The storage segment sets 151 through 155 are illustrated collectively as storage segment sets 150. When the storage segment servers 140 store their respective data using the storage service 170 offered by a cloud computing environment, the need to perform size of data operations is eliminated. For instance, such size of data operations may be the performance of a full backup of the entirety of the data. Conventionally, the primary compute system and each of the secondary compute systems would have to perform a full backup separately, by transferring data over a network. Thus, the principles described herein allow for excellent capability to scale the data upwards. However, a copy of the storage segment sets 151 through 155 may also be kept in a cache at each of the respective storage segment servers 141 through 145. This allows for rapid access to the storage segments. But if the storage segment is lost in the cache of the storage segment servers 140 (or even if one of the storage segment servers itself goes down), the storage segment is still available in the storage service 170 in the cloud computing environment.

Figure 5:
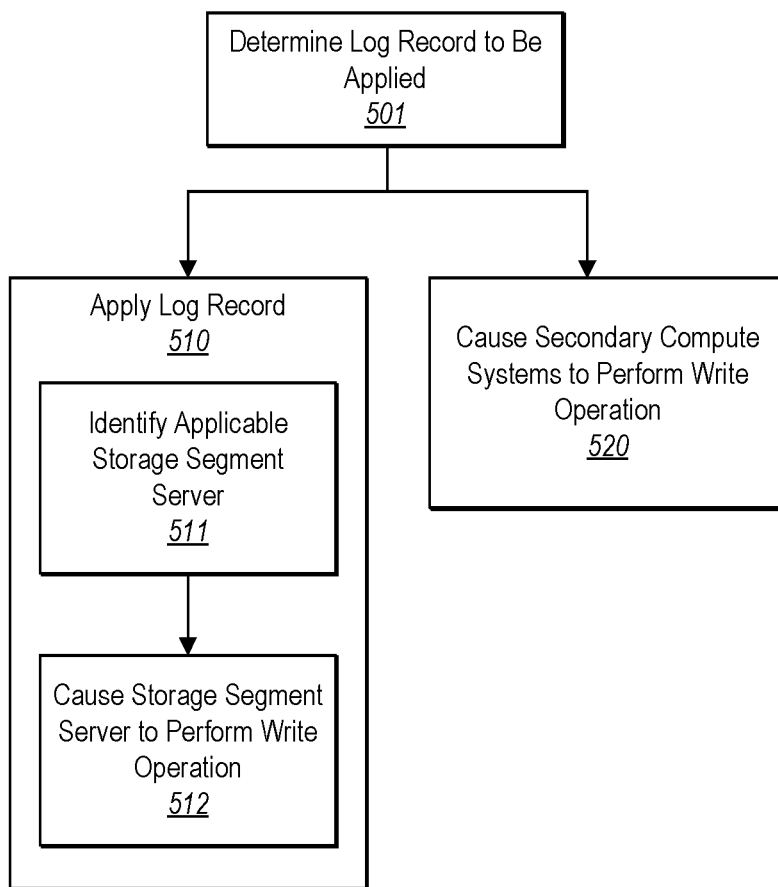
FIG. 5 illustrates a flowchart of a method for applying a log record to storage segments in accordance with the principles described herein.

FIG. 5 illustrates a flowchart of a method 500 for applying a log record to storage segments in accordance with the principles described herein. The method 500 may be performed for each of multiple log records that are identified as to be applied. Thus, the performance of method 500 many times allows the log to be applied to appropriate storage segments. That is, the write operations specified in the log records are applied to the storage segments within the appropriate storage segment servers. As an example, the method 500 may be performed by the log service computing system 132 of FIG. 1. The method 500 may be performed within the environment 100 of FIG. 1, in order to apply the log record 300 of FIG. 3. Accordingly, FIG. 5 will now be described with respect to the FIGS. 1 and 3.

The method 500 is initiated upon determining that a particular log record is to be applied (act 501). For instance, that particular log record may be the log record 300 of FIG. 3. In response to identifying that the particular log record is to be applied (act 501), the particular log record is applied (act 510). This may be done with respect to the particular storage segment server that corresponds to the storage segment. This may also be done with respect to each secondary compute system.

Accordingly, the applying of the log record (act 510) includes identifying a particular storage segment server that is assigned to a particular set of storage segments that includes the particular storage segment to be written to in the particular write operation (act 511). In the case in which the set of storage segments are contiguous in an address space, the assignment of the set of storage segments to each storage segment server may be made to align with the most significant bits of the storage segment identifier. For instance, suppose that the storage segment identifiers range from binary 00000,00000 (comma added every five bits to assist the reader) to binary 01101,01111. In that case, there might be seven storage segment servers, one for storage segments having identifiers with the four most significant bits being 0000, another for the storage segments having identifiers with the four most significant four bits being 0001, and so on, until the seventh storage segment for storage segments having identifiers with the four most significant bits being 0110. Thus, determining which storage segment server is assigned to store a particular storage segment becomes an efficient computation. The log service computing system 132 may thus determine the appropriate storage segment server for the log record 300 based on the storage segment identifier 303.

Then, the particular storage segment server is caused to perform the particular write operation to the particular storage segment designated in the particular log record (act 512). For instance, the log service computing system 132 may provide (e.g., as represented by arrow 103B) the log record 300 to the appropriate storage segment server (say storage segment server 142). This would represent the completion of the write operation that began when the primary compute system 110 read (as represented by the arrow 102) that storage segment from the storage segment server.

In one example, this notification (represented by arrow 103B) is not pushed to the appropriate storage segment server. Instead, it is up to the storage segment server to make inquiry of the log service computing system 132 for the appropriate log records. Thus, the providing of the appropriate log record to the storage segment server may be in response to the request from the particular storage segment server. Thus, the storage segment server 142 assigned to the storage segment written to may be notified of the write operation after the storage segment server 142 asks for applicable log entries (as represented by arrow 103A).

The log service computing system 132 may have a broker component 133 thereon that handles processing of incoming requests for log records. The broker 133 may be an executable component on the log service computing system. For instance, the broker 133 may be structured as described below for the executable component 806 of FIG. 8. The broker 133 may provide log records not one at a time, but perhaps one block at a time. For instance, if the broker 133 determines that there are any log records (e.g., any of log records 401, 402, 403, 404 or 405) within a block of log records (e.g., block 400) that have a storage segment identifier within the set of storage segments assigned to a particular storage segment server, the broker 133 may send the entire block to the particular storage segment server.

In addition, the broker 133 may ensure that the log record is not communicated to any entity until the log service computing system 132 has been notified that the log record has been securely written into the persistent log 131 (i.e., the log record has become public). This helps the recovery process be consistent. During recovery, the recovery uses the persistent log 131 to determine what operations have been completed. If other components in the system (e.g., a secondary compute system or a storage segment server) has performed operations that the persistent log 131 is not aware of, then the recovery will fail to achieve a reliable state. The user data then becomes ambiguous, and thus corrupt.

The broker 133 may also perform other tasks. For instance, the broker 133 may expect that the primary compute system 110 (which is the source of the generated log records) is unreliable. In order to compensate for that, the broker 133 may implement different policies for deduplicating log records that have been received multiple times from the primary compute system 110. The broker 133 may perform this deduplication by keeping track of the primary compute system generations and by retaining only the latest generation for all log records. The broker 133 may also expect log records to get lost and compensates for that by filling in log records that were missed (e.g., by reading from the fixed-size log portion 601) described below.

Returning to the method 500 of FIG. 5, the log service computing system also causes the secondary compute system(s) to perform the particular write operation on a copy of the storage segment at the secondary compute system (act 520). This may also be performed by communicating (as represented by arrows 104B and 105B in FIG. 1) the log record (e.g., log record 300) to each secondary compute systems 121 and 122. While the log record may be pushed to the secondary compute systems 120, the broker 133 may likewise handle requests for log records (as represented by arrows 104A and 105A) from the secondary compute systems 120. Again, the log records may be provided as a block. As a reminder, the broker 133 may ensure that log records are not communicated to the secondary compute systems 120 unless the log record is already confirmed as written to the persistent log 131. As one possible optimization, the secondary compute system may also perhaps ignore the log record if it is for writing to a storage segment that is not already cached (and thus would cause a read from a storage segment server). In that case, if the secondary compute system was to use that storage segment later, the secondary compute node may read that storage segment from the storage segment server (which already has the write of the skipped log record applied).

The persistent log 131 may be stored within a volume 135 that is within the storage service 170 in a cloud computing environment. That storage service 170 would ensure that the log records (e.g., each log record block) is redundantly saved prior to providing confirmation back to the primary compute system 110 that the log record block has been written. Once the storage service 170 ensures that a proper minimum number of copies of the log have been written to in the volume 135, the storage service 170 acknowledges the write as having been completed. The persistent log 131 may then immediately acknowledge (as represented by the arrow 101B) back to the primary compute system 110 that the write has completed, allowing the primary compute system 110 to continue performing operations that depend on that completion.

The volume 135 may be mounted to multiple computing systems. For instance, that single mounted volume 135 may be included within a drive that is mounted to the primary compute system 110 as a read and write volume, while being mounted to the secondary compute system(s) 120 as a read-only volume. Since there is only one computing system mounted to that volume as a write volume, multiple computing systems may be mounted to the volume 135 without risk of corruption of data due to competing or inconsistent write operations. The volume might be within a cloud computing environment as part of a cloud store service. For instance, rather than read log records from the broker 133, the storage segment servers 140 and/or the secondary compute systems may read log records directly from the persistent log 131.

In some embodiments, the storage segment sets 150 may be managed by a cloud service in a cloud computing environment. In that case, the cloud service may itself ensure that a minimum number (or a quorum) of redundant copies of the storage segment is stored within the cloud storage prior to the write operation being considered successful. The quorum is established such that in case of failure, the quorum of redundant copies of the storage segment allows for a definitive determination on what the content of the storage segment is. Thus, when the storage segment server acknowledges completion of the write operation, the write operation has already been executed onto a least a quorum of storage locations. Since the secondary compute systems are no longer responsible for maintaining the quorum, the number of secondary compute systems is highly flexible. Instead, secondary compute systems are used more often to allow for local secondary compute systems to be available for processing, and also to account for failover, and not to ensure durability of the storage itself.

Accordingly, the principles described herein describe an architecture in which the data is separated from the primary and secondary compute systems. Because a relatively smaller amount of data is actually cached by the secondary compute system, it becomes relatively quick to build a new secondary compute system. The cache of the secondary compute system may be empty, which would just mean it might take a little longer for some of the initial read operations. For instance, a new secondary compute system may be established when further redundancy is wanted in order to increase levels of availability. Alternatively, a new secondary compute system may be established to replace a just-promoted secondary compute system that is now acting as the primary compute system, in order to maintain a current level of availability.

The time taken to build a new secondary compute system is reduced significantly since a new secondary compute system no longer needs to have a directly attached volume with an entire replica of the data. Instead, the secondary compute system only may need the application, and a relatively small cache. Furthermore, the establishment of a quorum for purposes of determining whether a log record has been properly entered into the log may now be handled by a storage service, in cases in which the primary compute system writes to a volume attached into that storage service. In such cases, the write to the log only completes once the storage service has already established that the log record has been durably written to an appropriate number of locations.

Having described the principles of the environment 100 with respect to FIGS. 1 through 5, more regarding the log within the volume 135 will now be described with respect to FIGS. 6 through 7D. Recall that the volume 135 is a write volume for the primary compute system 110, but a read-only volume for the secondary compute system(s) 120. This is possible because only the primary compute system 110 writes to the log within the volume 135, whereas the secondary compute system(s) 120 only reads from the persisted log 131 within the volume 135. There is herein described a refinement on how an infinite log (one that may grow within limit) may be accommodated based on the volume 135, while allowing all of the entities that read from the log to know what address to read from within the log.

Figure 6:
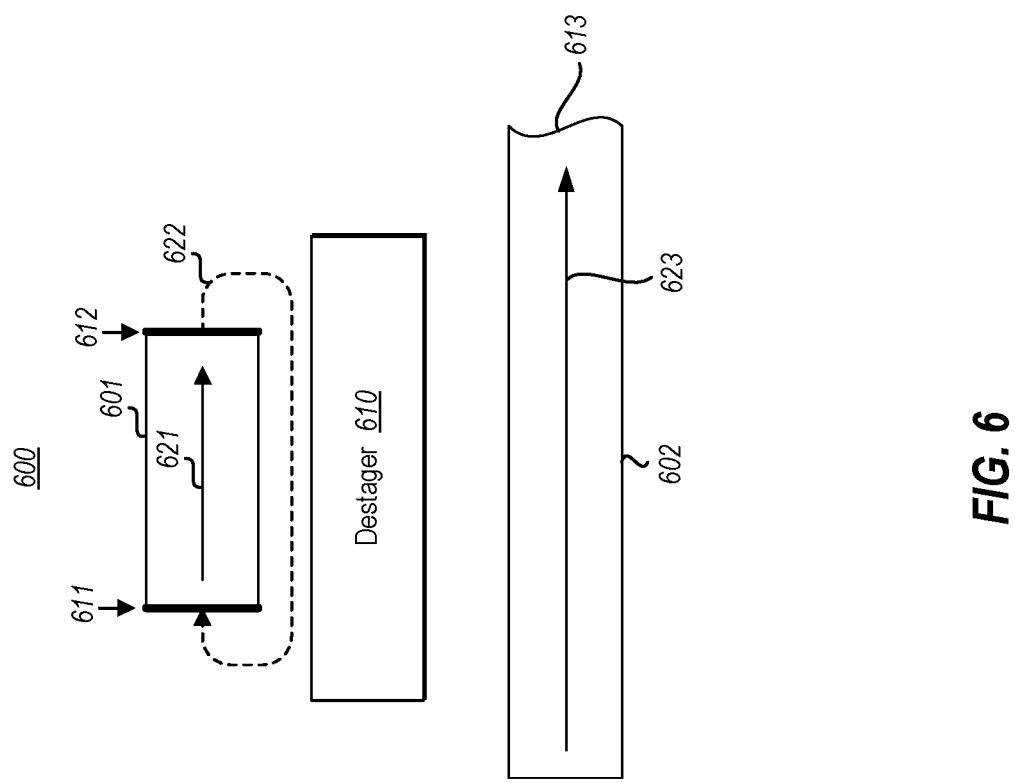
FIG. 6 illustrates a log environment in which the log is composed of two components—a fixed-size log portion and a growable log portion.

FIG. 6 illustrates a log environment 600 in which there is a log that is composed of two components—a fixed-size log portion 601 and a growable log portion 602. The fixed-size log portion is fixed in size as symbolically represented by the boundaries 611 and 612 being thicker. The fixed-size log portion 601 includes the more recent log records recorded in the log (and includes the tail of the log). As will become apparent further below, an advantage of the fixed-size log portion 601 being fixed in size is that readers of the fixed-size log portion 601 are able to deterministically know where a log record is located within the fixed-size log portion 601 using only the log sequence number of that log record. Furthermore, the fixed-size log portion is in a format that is designed to be safely shared between readers and writers. This simplifies the process of enabling readers to read log records from the log.

The fixed-size log portion 601 is sequentially written to as represented by the arrow 621. When the end (e.g., end 612) of the fixed-size log portion 601 is encountered, the writing wraps back (as represented by dashed-lined arrow 622) to the beginning (e.g., beginning 611) of the fixed-size log portion 601 to continue writing to the log. Thus, the writing to the fixed-size log portion 601 occurs in circular fashion. Because of the circular write pattern, older log records will be overwritten by newer log records. Prior to that happening, a destager component 610 writes those older log records sequentially onto the end (e.g., end 613) of the growable log portion 602. In this manner, the growable log portion 602 grows sequentially in direction 623.

Thus, the fixed-size log portion 601 includes newer log records, which are the log records that are most often read from. On the other hand, the growable log portion 602 includes older log records that are less often read. Furthermore, the fixed-size log portion 601 will include the tail of the log, which is the last log record written to the log as a whole. In case of failure, it is important to be able to identify the tail of the log since that log record is the last log record that the log service has guaranteed will be executed even if there is a failure that occurs prior to the data operation represented by the log record having been completed. During recovery, the recovery process restores the last checkpoint, and redoes the data operations of each log record one at a time until the tail of the log is encountered.

Figure 7A:
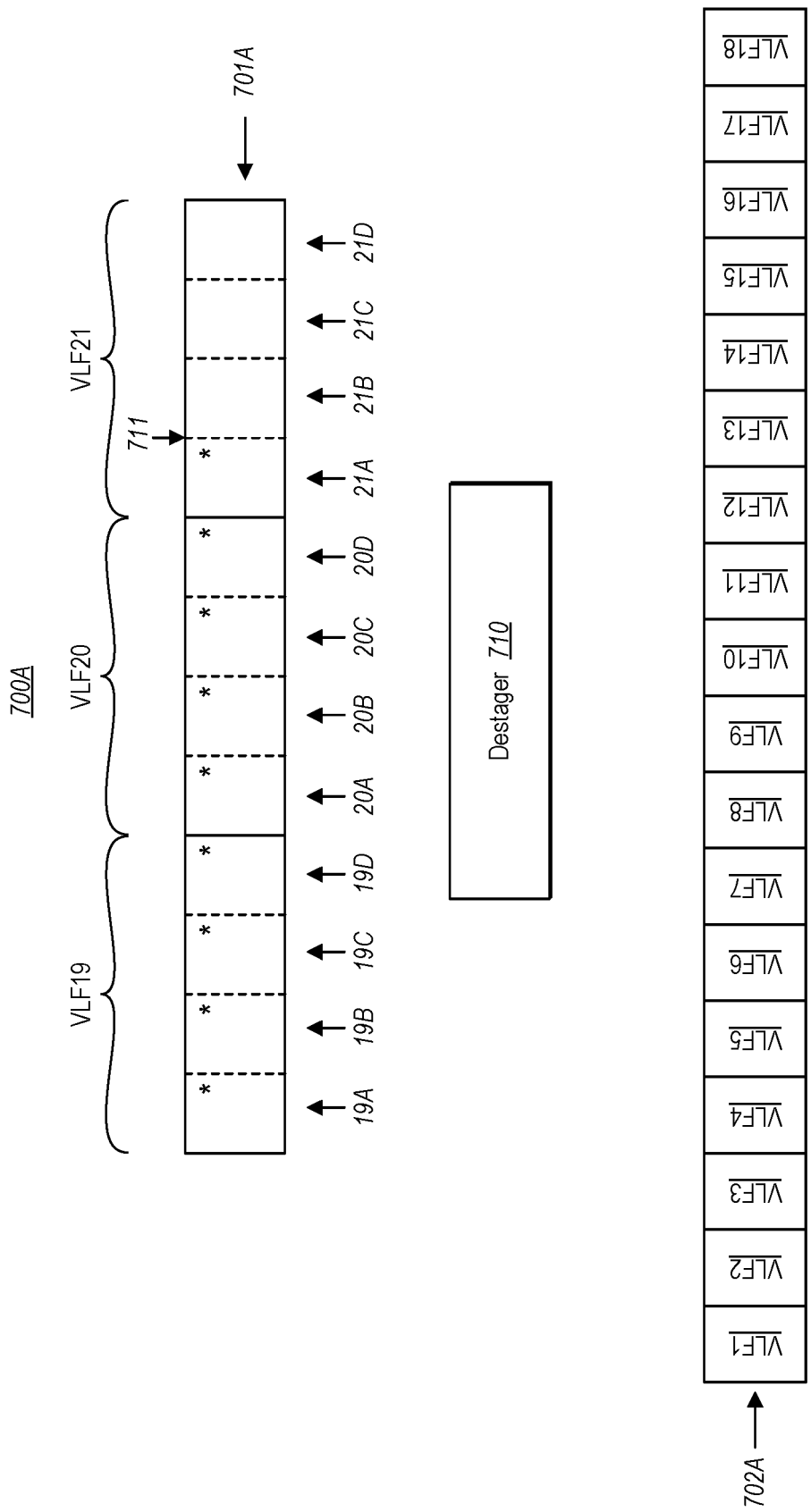
FIG. 7A illustrates a log environment that represents a specific example of the log environment of FIG. 6, and in which the fixed-size log portion includes three virtual log files (each having four blocks), and in which the growable log portion has therein eighteen virtual log files.

FIG. 7A illustrates a log environment 700A that represents a specific example of the log environment 600 of FIG. 6. The fixed-size log portion 701A of FIG. 7A represents an example of the fixed-size log portion 601 of FIG. 6. The growable log portion 702A of FIG. 7A represents an example of the growable log portion 602 of FIG. 6. In this example, and in one embodiment, the fixed-size log portion 701A is sized to include an odd number of sub-portions. For instance, a sub-portion may be a virtual log file. As will become apparent from the description below, an advantage of the log portion 701A being sized to include an odd number of virtual log files is that the normal operation of initializing sub-portions is simplified, while still allowing recovery processes to find the tail of the log. In this specific example, the fixed-size log portion 701A is sized to include three virtual log files.

Suppose that thus far, the log is composed of 21 virtual log files (or "VLFs"), and that virtual log files are identified in sequential order as VLF1, VLF2, VLF3, and so forth. The fixed-size log portion 701A would include the last three virtual log files VLF19, VLF20, and VLF21. The older virtual log files VLF1 through VLF18 would have been previously destaged into the growable log portion 701A by the destager 710.

In this example, and as most apparent from the fixed-size log portion 701A, each portion (e.g., virtual log file) includes a fixed number of blocks. While a virtual log file may typically have a very large number of blocks, to keep the example simple, each virtual log file (e.g., VLF19 to VLF21) is illustrated as having four (4) blocks. For instance, virtual log file VLF19 is sequentially composed of blocks 19A to 19D, virtual log file VLF20 is sequentially composed of blocks 20A to 20D, and virtual log file VLF21 is sequentially composed of blocks 21A to 21D.

When a log record is written into the persistent log, a block that includes that log record is written into the fixed-size log file. Each log record within the block occurs a slot within the block. A log sequence number may thus be composed of a concatenation of a virtual log file identifier, a block identifier, and a slot identifier. Note that with the knowledge that the fixed-size log portion 701A has within it VLF19, VLF20 and VLF21 sequentially arranged in that order, any reader can get any log record within any of those virtual files with just the log sequence number. The block can be identified from the log sequence number allowing the proper block to be read. Then, the slot identifier from the log sequence number may be used to extract the proper log record from that block.

In any case, blocks are written by the primary compute system 110 one block at a time sequentially to the fixed-size log file. In the example of FIG. 7A, a block is represented as written to when it has an asterisk in the upper right corner. Thus, at the point in time illustrated in FIG. 7A, the tail of the log (represented by pointer 711) is just after the block 21A since block 21A is the last block written.

The destager 710 monitors the position of the tail of the log (i.e., the position of the most recent block written to) in the fixed-size log portion 701A, and ensures that any virtual log files that are about to be overwritten are destaged into the growable log portion 702A. Then, storage locations of the fixed-size log portion 701A that were used to store that newly-destaged virtual log file may be reused for a subsequent virtual log file.

Figure 7B:
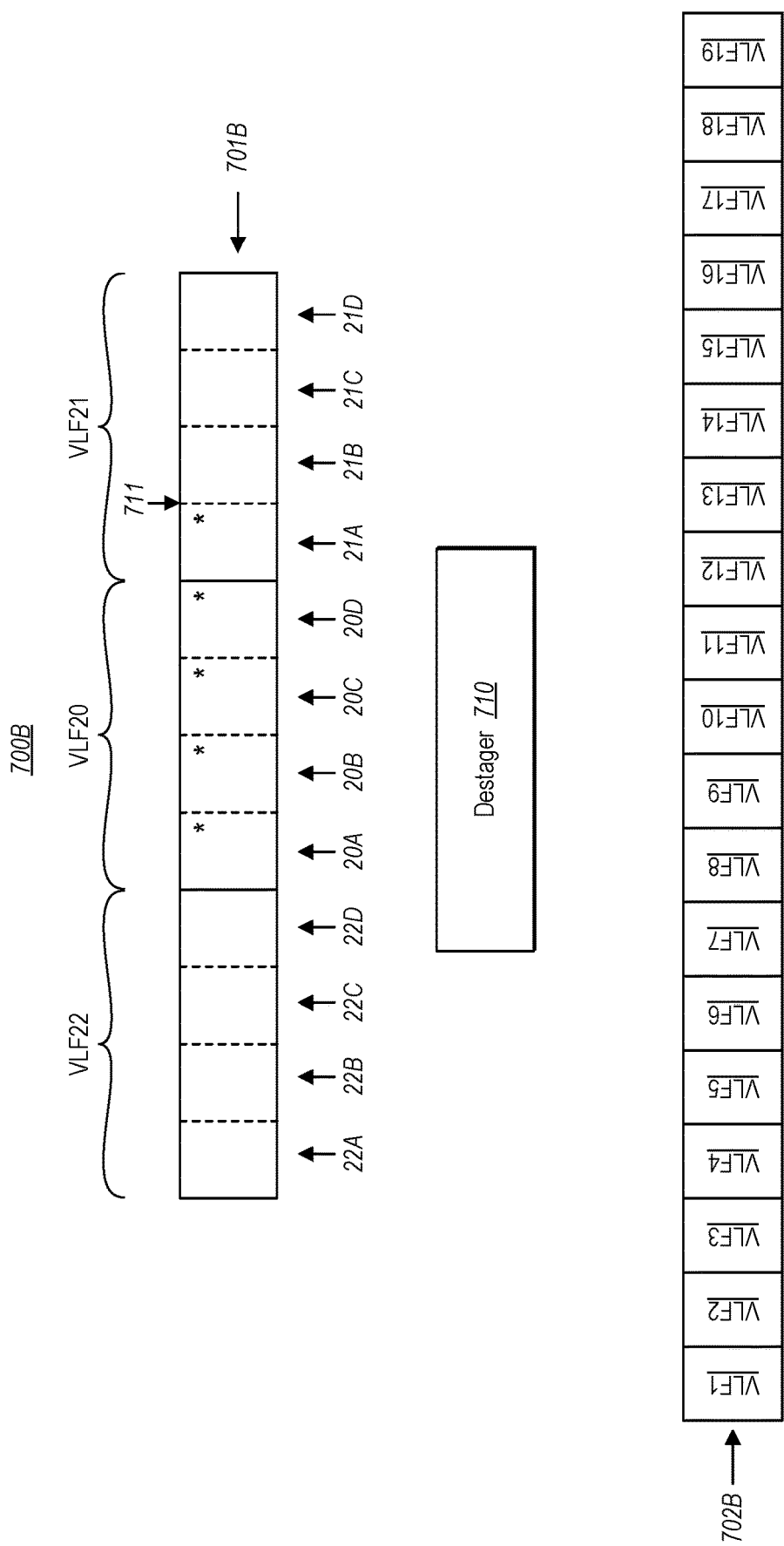
FIG. 7B illustrates a log environment that represents a subsequent state of the log environment of FIG. 7A after virtual log file VLF19 has been destaged, and the storage locations of the fixed-size log portion are reused by a subsequent virtual log file VLF22.

FIG. 7B illustrates a log environment 700B that represents a subsequent state of the log environment 700B after virtual log file VLF19 has been destaged, and the storage locations of the fixed-size log file 701A (now called labelled 701B) reused by a subsequent virtual log file VLF22 having blocks 22A, 22B, 22C and 22D. In this example, the sub-portion identifier (e.g., the virtual log file identifier) for each successively initialized sub-portion (e.g., a virtual log file) is incremented each time a new sub-portion (e.g., a virtual log file) is initialized within the fixed-size log portion. Note also that the growable log portion 702B has now grown by one virtual log file to now include virtual log file VLF19. In this example, the tail of the log 711 in FIG. 7B has not moved compared to the tail of the log in FIG. 7A. That is, the tail of the log 711 is still just after block 21A.

Now suppose that a checkpoint is taken at this point (right after block 21A is written to the fixed-size log portion 701B). Then, consistent with the sequential and circular writing pattern, suppose that the following blocks are then written to in sequence into the fixed-size log portion 701B: block 21B, block 21C, block 21D, block 22A, and block 22B. The result will be the log environment 700C of FIG. 7C. Note now that the fixed-size log portion 701C has up to block 22B shown with an asterisk, and thus the tail of the log 711 is now just after block 22B. Furthermore, for convenience, the snapshot pointer 712 is represented for the convenience of the reader and will be referenced further below.

Figure 7C:
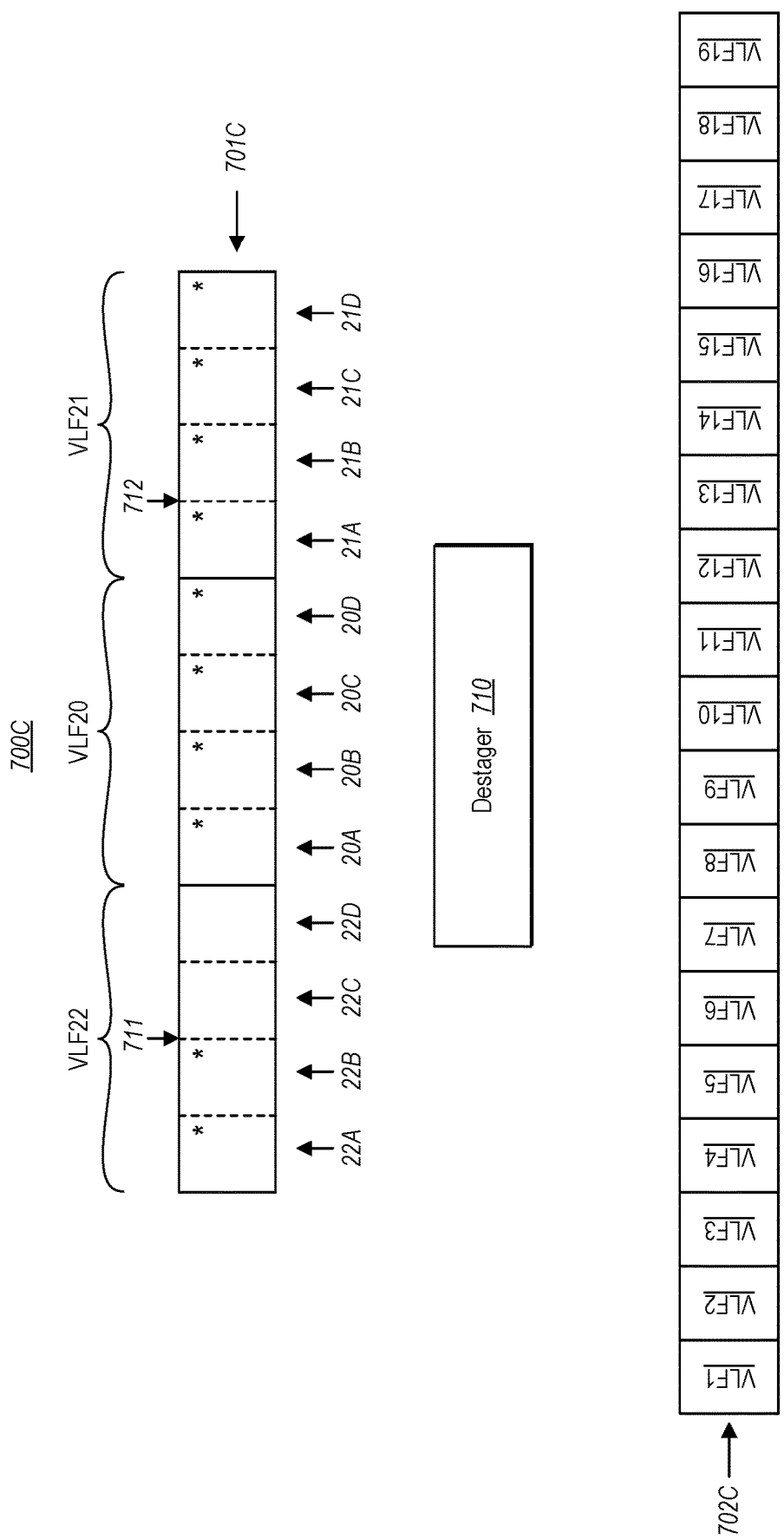
FIG. 7C illustrates a log environment that represents a subsequent state of the log environment of FIG. 7B after a checkpoint is taken at this point and after blocks are further written up to, and including, block 22B.

Now suppose that a failure occurs when the tail of the log 711 is just after block 22B (as shown in FIG. 7C). The task during recovery would be to first restore the most recent snapshot. In FIG. 7C, that would bring the state of the data up to just after the data operation for all of the log records within block 21A are executed. But to bring the data fully current, the recovery process executes all subsequent data operations represented by subsequent log records until the tail of the log (at point 711) is encountered. The problem though is identifying when the tail of the log is encountered. After all, the blocks 22C and 22D still have data in them, though it is the log records that were destaged as part of blocks 19C and 19D. Thus, it is important to recognize what blocks have been written to as part of the current virtual log file (VLF22), and distinguish those blocks from those blocks that have stale data from a prior circular write cycle.

In order to allow the recovery process to make this distinction, there is a new marker data within each block that, together with the current virtual log file identifier, allows the recovery process to deterministically conclude whether or not new data has been written to the block as part of the current virtual log file. In one embodiment, the new marker data may be two bits within a block. The value of these bits, in conjunction with the sub-portion identifier, allows the recover process to determine which blocks have been written to.

For instance, suppose that when writing to blocks of sub-portions having odd sub-portion identifiers (e.g. VLF19 or VLF 21), the two bits are written with a first possible value (e.g., 01). In that case, when writing to blocks of sub-portions having even sub-portion identifiers (e.g., VLF20 or VLF 22), the two bits are written with the second possible value (e.g., 10).

Figure 7D:
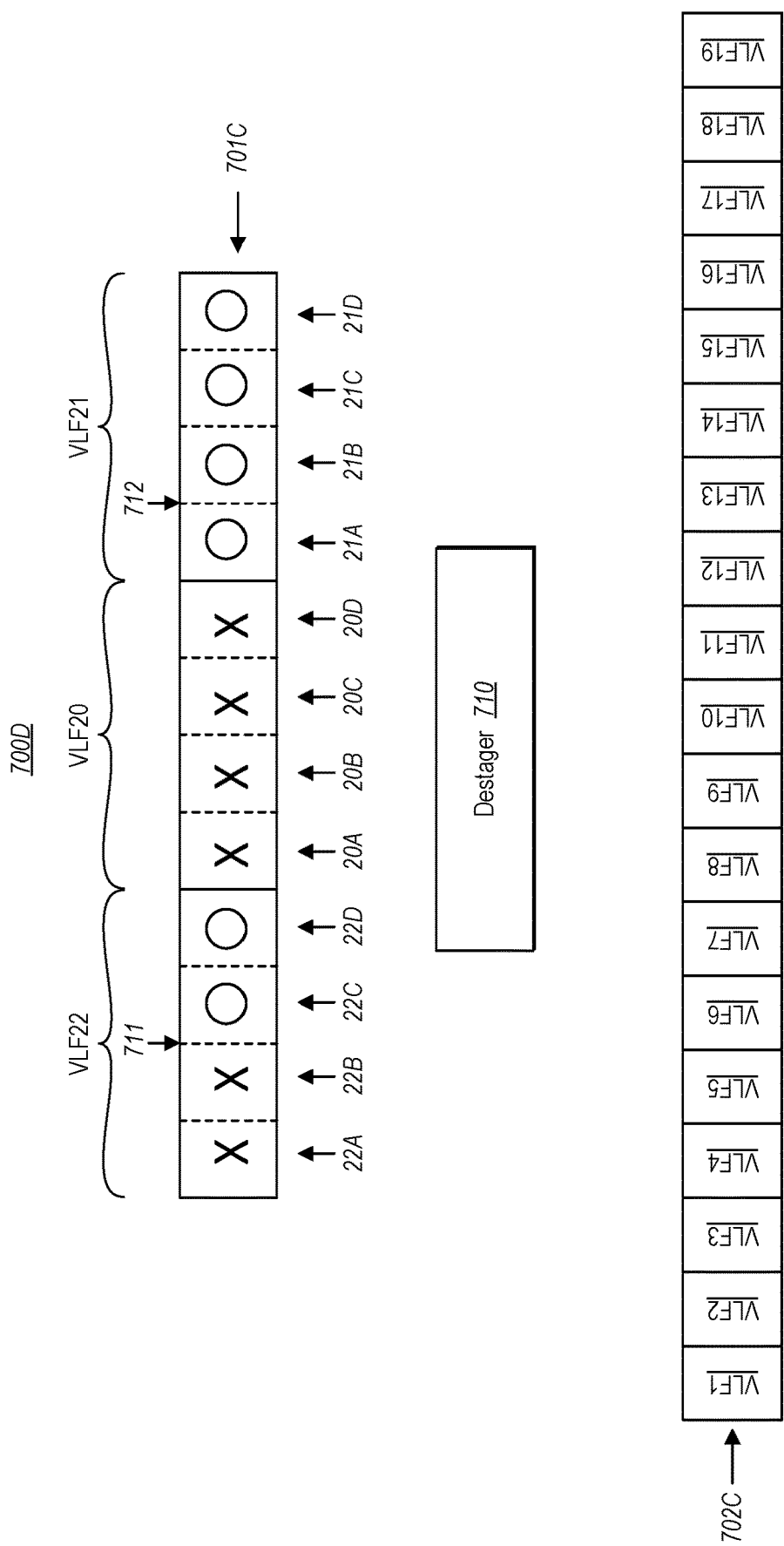
FIG. 7D illustrates the log environment of FIG. 7C, with Xs and Os inserted into the blocks to represent write marker bits that are tied to the virtual log file.

FIG. 7D is a log environment 700D that is the same as the environment 700C of FIG. 7C, except that an "0" fills those blocks that would have the bits 01 using the convention described in the previous paragraph, and that an "X" fills those blocks that would have the bits 10 using the convention described in the previous paragraph. The asterisks have been removed since they were used just for the convenience of the reader.

The sub-portion VLF20 has had all of its blocks written to (since the tail of the log is way forward in VLF22). Thus, because the sub-portion identifier VLF20 is even, the two bits would be 10, and thus the blocks 20A, 20B, 20C and 20D are shown as having an X. Of course, recovery should look for the tail of the log in the most recent sub-portion VLF22. However, even though the recovery does not need to look for the tail of the log in any of the prior sub-portions, if the recovery did examine sub-portion VLF20, the recovery would know that the tail of the log is not there.

The sub-portion VLF21 has had all of its blocks written to (since the tail of the log is way forward in VLF22). Thus, because the sub-portion identifier VLF21 is odd, the two bits would be 01, and thus the blocks 21A, 21B, 21C and 21D are shown as having an 0. Thus, if the recovery did examine sub-portion VLF21, the recovery would know that the tail of the log is not there.

The sub-portion VLF22 has only some of its blocks written to since the tail of the log 711 is within the sub-portion VLF22. Specifically, because the sub-portion identifier VLF is even, the two bits of the two blocks 22A and 22B written to would be 10, and are thus shown with the "X" inside. However, note that the old data from VLF19 is still within blocks 22C and 22D. That old data was written to those blocks when the primary compute system was writing to blocks 19C and 19D as part of sub-portion VLF19. Since that data has not changed at all, the two bits of blocks 22C and 22D remain 01, and are thus marked with an "0" inside. Thus, without having to reformat the storage space that was used for sub-portion VLF19 when beginning to reuse the storage space for sub-portion VLF22, the recovery process may still find the tail of the log. This effect is achieved precisely because there are an odd number (three) of sub-portions within the fixed-size log portion, and the sub-portions are added with identifiers that alternate between even and odd (which happens when they monotonically increase by one each time).

Thus, the log written to the volume 135 may be optimized such that the more frequently accessed blocks (that include the most recent log records) are optimized so that any reader may read those blocks and access appropriate log records using only the log sequence number. Furthermore, the writes may happen during normal operation such that, in a subsequent recovery, the tail of the log may be quickly found, without having to expend effort reformatting the storage space in the fixed-size log portion. Thus, truly, the log service may acknowledge that the data operation is guaranteed to take place once the block having that log record is written into the log of the log environment 600 of FIG. 6.

Additionally, because the fixed-size log portion is fixed in size, the management data of the drive 135 stays the same. Also, as described above, the fixed-size log portion is designed to be safely shared between readers and writers in that the content is self-describing. This allows readers and the writer to be safe from torn writes and other concurrent access distortions even though the readers and write need not communicate with each other. Thus, the drive 135 can be mounted to multiple computing systems.

Because the principles described herein operate in the context of a computing system, a computing system will be described with respect to FIG. 8. Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 8:
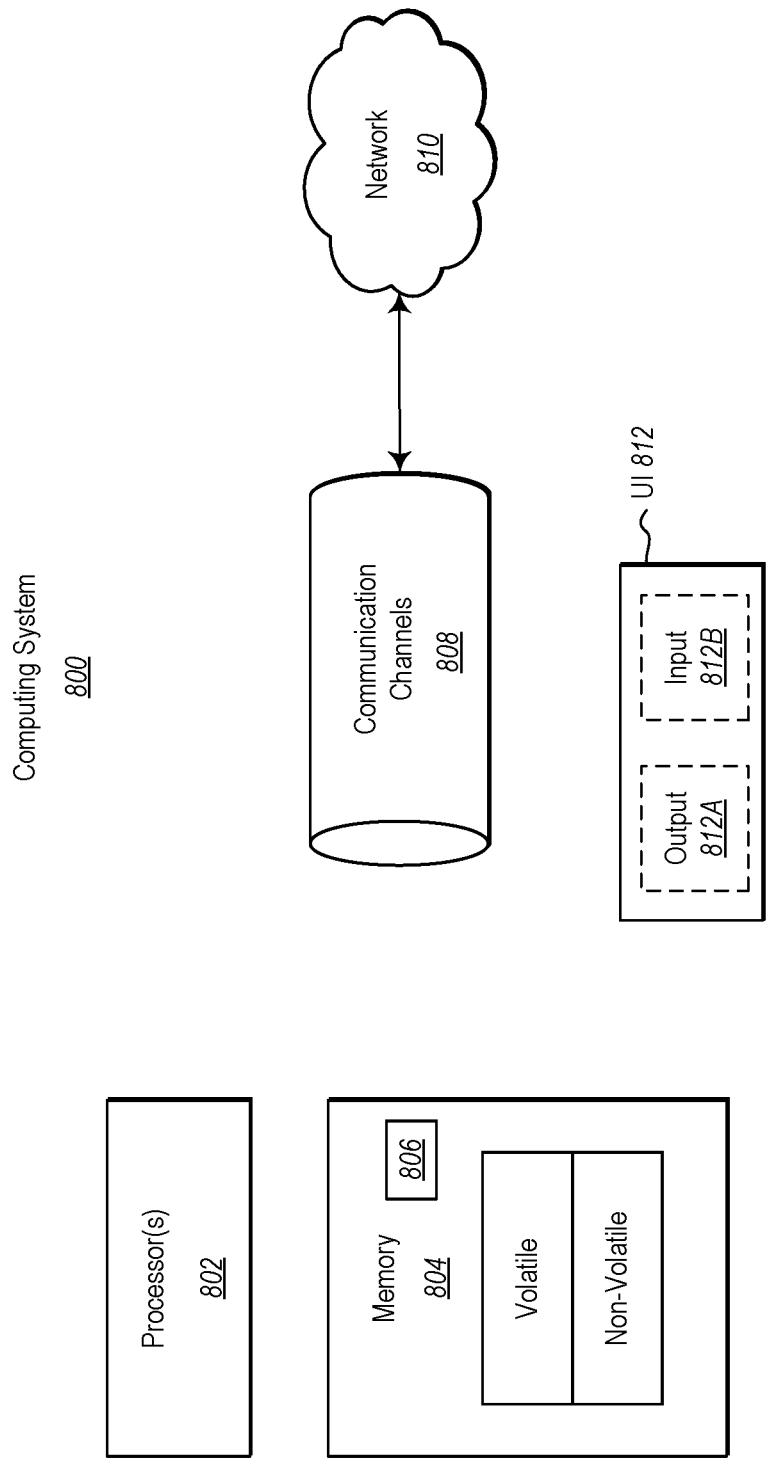
FIG. 8 illustrates an example computer system in which the principles described herein may be employed.

As illustrated in FIG. 8, in its most basic configuration, a computing system 800 typically includes at least one hardware processing unit 802 and memory 804. The memory 804 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 800 has thereon multiple structures often referred to as an "executable component". For instance, the memory 804 of the computing system 800 is illustrated as including executable component 806. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 804 of the computing system 800. Computing system 800 may also contain communication channels 808 that allow the computing system 800 to communicate with other computing systems over, for example, network 810.

While not all computing systems require a user interface, in some embodiments, the computing system 800 includes a user interface 812 for use in interfacing with a user. The user interface 812 may include output mechanisms 812A as well as input mechanisms 812B. The principles described herein are not limited to the precise output mechanisms 812A or input mechanisms 812B as such will depend on the nature of the device. However, output mechanisms 812A might include, for instance, speakers, displays, tactile output, holograms, virtual reality, and so forth. Examples of input mechanisms 812B might include, for instance, microphones, touchscreens, holograms, virtual reality, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors; and
one or more computer-readable storage media having thereon computer-execution instructions that are structured such that, when executed by the one or more processors, the computing system is caused to perform the following:
identify one or more log records to apply, the one or more log records including a particular log record that was logged by a primary compute system and that designates a particular write operation to a particular storage segment; and
in response to identifying the particular log record to apply, apply the particular log record by performing the following:
identifying a particular storage segment server that is assigned to a particular set of storage segments that includes the particular storage segment to be written to in the particular write operation;

causing the particular storage segment server to perform the particular write operation to the particular storage segment designated in the particular log record; and causing a secondary compute system to perform the particular write operation on a cached copy of the storage segment stored within a cache of the secondary compute system, the secondary compute system being configured to be elevated to replace the primary compute system in the event that the primary compute system fails.

2. The computing system in accordance with claim 1, the causing of the particular storage segment server to perform the particular write operation being performed in response to receiving a request from the particular storage segment server for the particular log record, the causing of the particular storage segment server to perform the particular write operation being performed by providing the particular log record to the particular storage segment server in response to the request from the particular storage segment server.

3. The computing system in accordance with claim 2, the particular log record including a plurality of log records organized within a block, the particular log record being provided to the particular storage segment server by providing the block to the particular storage segment server.

4. The computing system in accordance with claim 1, the particular log record being generated in response to a primary compute system reading the particular storage segment from the particular storage segment server, determining an incremental change to be made to the particular storage segment, making the incremental change to the copy of the particular storage segment, and identifying the incremental change and an identifier of the particular storage segment within the particular log record.

5. The computing system in accordance with claim 1, the causing the particular storage segment server to perform the particular write operation to the particular storage segment occurring after confirming that the particular log record has been saved to a centralized log.

6. The computing system in accordance with claim 1, the causing of the particular storage segment server to perform the particular write operation being performed in response to receiving a request from the secondary compute system for the particular log record, the causing of the secondary compute system to perform the particular write operation being performed by providing the particular log record to the secondary compute system in response to the request from the secondary compute system.

7. The computing system in accordance with claim 6, the particular log record including a plurality of log records organized within a block, the particular log record being provided to the secondary compute system by providing the block to the secondary compute system.

8. The computing system in accordance with claim 1, the causing the secondary compute system to perform the particular write operation occurring after confirming that the particular log record has been saved to a centralized log.

9. The computing system of claim 1, wherein the one or more log records to apply are logged within a volume that is mounted to the primary compute system as a read and write volume while being mounted to the secondary compute system as a read-only volume.

10. A method for applying a log to storage segments, the method comprising:

identifying one or more log records to apply, the one or more log records including a particular log record that designates a particular write operation to a particular storage segment; and in response to identifying the particular log record to apply, applying the particular log record by performing the following:
identifying a particular storage segment server that is assigned to a particular set of storage segments that includes the particular storage segment to be written to in the particular write operation;
refraining from causing the particular storage segment server to perform the particular write operation to the particular storage segment designated in the particular log record until after confirming that the particular log record has been saved to a centralized log; and
in response to determining that the particular log record has been saved to a centralized log, causing the particular storage segment server to perform the particular write operation to the particular storage segment designated in the particular log record.

11. The method in accordance with claim 10, the particular log record being a first log record, the particular write operation being a first write operation, the particular storage segment being a first storage segment, the particular storage segment server being a first storage segment server, the particular set of storage segments being a first set of storage segments, the one or more log records further including a second log record that designates a second write operation to a second storage segment, the method further comprising:
identifying a second storage segment server that is assigned to a second set of storage segments that includes the second storage segment to be written to in the second write operation, the second storage segment server being different than the first storage segment server, the second set of storage segments being different than the first set of storage segments; and
causing the second storage segment server to perform the second write operation to the second storage segment designated in the second log record.

12. The method in accordance with claim 10, the causing of the particular storage segment server to perform the particular write operation being performed in response to receiving a request from the particular storage segment server for the particular log record, the causing of the particular storage segment server to perform the particular write operation being performed by providing the particular log record to the particular storage segment server in response to the request from the particular storage segment server.

13. The method in accordance with claim 12, the particular log record including a plurality of log records organized within a block, the particular log record being provided to the particular storage segment server by providing the block to the particular storage segment server.

14. The method in accordance with claim 10, the particular log record being generated in response to a primary compute system reading the particular storage segment from the particular storage segment server, determining an incremental change to be made to the particular storage segment, making the incremental change to the copy of the particular storage segment, and identifying the incremental change and an identifier of the particular storage segment within the particular log record.

15. The method in accordance with claim 10, the method further comprising the following in response to identifying the particular log record to apply:

causing a secondary compute system to perform the particular write operation, on a copy of the storage segment at the secondary compute system.

16. The method in accordance with claim 15, the causing of the particular storage segment server to perform the particular write operation being performed in response to receiving a request from the secondary compute system for the particular log record, the causing of the secondary compute system to perform the particular write operation being performed by providing the particular log record to the secondary compute system in response to the request from the secondary compute system.

17. The method in accordance with claim 16, the particular log record including a plurality of log records organized within a block, the particular log record being provided to the secondary compute system by providing the block to the secondary compute system.

18. The method in accordance with claim 15, the causing the secondary compute system to perform the particular write operation occurring after confirming that the particular log record has been saved to a centralized log.

19. A computer program product comprising one or more hardware storage devices having thereon computer-executable instructions that are executable by one or more processors of a computing system to configure the computing system to perform the following:
    identify one or more log records to apply, the one or more log records including a particular log record that designates a particular write operation to a particular storage segment; and
    in response to identifying the particular log record to apply, apply the particular log record by performing the following:
        identifying a particular storage segment server that is assigned to a particular set of storage segments that includes the particular storage segment to be written to in the particular write operation;
        refraining from causing the particular storage segment server to perform the particular write operation to the particular storage segment designated in the particular log record until after confirming that the particular log record has been saved to a centralized log; and
        in response to determining that the particular log record has been saved to a centralized log, causing the particular storage segment server to perform the particular write operation to the particular storage segment designated in the particular log record.

\* \* \* \* \*